US009027282B2

(12) United States Patent
Schreiner et al.

(10) Patent No.: US 9,027,282 B2
(45) Date of Patent: May 12, 2015

(54) MODIFIABLE SLIDER GLASS ASSEMBLIES FOR UTILITY CABS AND VEHICLES, AND/OR METHODS OF MAKING THE SAME

(75) Inventors: Mark A. Schreiner, Tiffin, OH (US); Darrin Neitzke, Marysville, MI (US); Duane O. Recker, Auburn, IN (US)

(73) Assignee: Guardian Industries Corp., Auburn Hills, MI (US)

( * ) Notice: Subject to any disclaimer, the term of this patent is extended or adjusted under 35 U.S.C. 154(b) by 1008 days.

(21) Appl. No.: 12/289,770

(22) Filed: Nov. 3, 2008

(65) Prior Publication Data
US 2010/0107505 A1    May 6, 2010

(51) Int. Cl.
*E05D 15/06* (2006.01)
*B60J 1/18* (2006.01)
*E05D 15/10* (2006.01)

(52) U.S. Cl.
CPC ........... *E05D 15/0608* (2013.01); *B60J 1/1853* (2013.01); *E05D 15/1047* (2013.01); *E05Y 2900/55* (2013.01)

(58) Field of Classification Search
CPC ......... B60J 1/1853; B60J 1/1861; E05D 7/10; E05D 15/0621; E05D 15/0652; E05D 15/1047; E05D 15/16
USPC .................... 49/413, 381, 209, 210, 211, 213
See application file for complete search history.

(56) References Cited

U.S. PATENT DOCUMENTS

| 5,836,110 | A  | * | 11/1998 | Buening ........................ 49/360 |
| 5,996,284 | A  | * | 12/1999 | Freimark et al. ............... 49/209 |
| 7,051,478 | B2 | * | 5/2006  | Bourque et al. ................ 49/413 |
| 7,155,863 | B2 |   | 1/2007  | Daniel et al. |
| 7,584,574 | B2 | * | 9/2009  | Kinross et al. ................. 49/413 |
| 8,469,437 | B2 | * | 6/2013  | Zanetti et al. ............ 296/146.16 |
| 2004/0251714 | A1 | | 12/2004 | Hintzke et al. |
| 2005/0044797 | A1 | | 3/2005  | Daniel et al. |
| 2006/0107599 | A1 | | 5/2006  | Luten |
| 2008/0060275 | A1 | | 3/2008  | Recker |

* cited by examiner

*Primary Examiner* — Katherine Mitchell
*Assistant Examiner* — Catherine A Kelly
(74) *Attorney, Agent, or Firm* — Nixon & Vanderhye P.C.

(57) ABSTRACT

Certain example embodiments relate to a sliding window assembly (e.g., of the type found in utility cabs or other vehicles), and methods of making the same. A slidable window panel includes at least one top pin and at least one bottom pin attached thereto. A single fixed window panel includes a hole being defined therein for receiving the slidable panel. Elongated upper and lower rails connected to the fixed panel include upper and lower rail channels defined therein for slidingly receiving the at least one top and bottom pin attached to the slidable panel. Forward and rear end details are provided to each of the upper and lower rails proximate to the hole for slidingly receiving, in respective channels formed therein, the at least one top and bottom pins. The slidable panel is laterally movable when being opened via the respective rail channels provided to the upper and lower rails. The channels in the forward and rear end details are formed so that the slidable panel is movable slightly outwardly towards the hole when the slidable window is being closed and slightly inwardly away from the hole when the slidable window is being opened.

20 Claims, 5 Drawing Sheets

Cross Section

MODIFIABLE SLIDER GLASS ASSEMBLIES FOR UTILITY CABS AND VEHICLES, AND/OR METHODS OF MAKING THE SAME

FIELD OF THE INVENTION

Certain example embodiments of this invention relate to a sliding window assembly, and methods of making the same. More particularly, certain example embodiments of this invention relate to a sliding window assembly (e.g., of the type found in utility cabs or other vehicles), and methods of making the same. In certain example embodiments, the sliding window is guided substantially parallel to an outer glass window until it becomes close to a hole formed in the outer glass. At such location(s), front and rear end details help guide the sliding window in and toward the hole so as to close and seal it. The slider glass assemblies of certain example embodiments may include, for example, structural components that are easily modifiable so as to incorporate other cab or vehicle designs, and/or a robust water resistant sealing means.

BACKGROUND AND SUMMARY OF EXAMPLE EMBODIMENTS OF THE INVENTION

Slider windows for vehicles are known. For example, see U.S. Pat. No. 7,155,863; and U.S. application Ser. Nos. 11/896,604; 10/996,046; 10/653,412; and 10/460,033, the entire contents of each of which is hereby incorporated herein by reference in its entirety.

Although such known slider windows have been used successfully in connection with a variety of applications, further enhancements to such techniques are still possible. For example, such designs typically are specific to a particular application, whether that application is for a pickup truck, tractor, etc., and/or particular models of the same. Furthermore, it is often difficult to modify a single system to take into account the number of variables that exist, even within a particular application. For example, it often is difficult to adjust the rails, the substantially horizontal movement of the slidable window assembly, etc., to account for different window or cab sizes, etc. Such slidable assemblies also often do not form particularly good seals between the interior of the vehicle or utility cab and the exterior.

Thus, it will be appreciated that there is a need in the art for improved slider glass assemblies, and/or methods of making the same. For example, it will be appreciated that there is a need in the art for slider glass assemblies that include structural components that are easily modifiable so as to facilitate incorporation in other cab or vehicle designs, and/or a more robust water resistant sealing means than what is currently available in today's market.

In certain example embodiments of this invention, a window assembly for use in a vehicle is provided. A slidable window panel includes at least one top pin and at least one bottom pin attached thereto. A single fixed window panel includes a hole being defined therein for receiving the slidable panel. An elongated upper rail includes an upper rail channel defined therein for slidingly receiving the at least one top pin attached to the slidable panel, the upper rail being connected to the fixed panel. An elongated lower rail includes a lower rail channel defined therein for slidingly receiving the at least one bottom pin attached to the slidable panel, the lower rail being connected to the fixed panel. Forward and rear end details are provided to each of the upper and lower rails proximate to the hole for slidingly receiving, in respective channels formed therein, the at least one top pin and the at least one bottom pin. The upper rail channel and the lower rail channel are provided at a common depth. The slidable panel is laterally movable when being opened via the respective rail channels provided to the upper and lower rails. The channels in the forward and rear end details are formed so that the slidable panel is movable slightly outwardly towards the hole when the slidable window is being closed and slightly inwardly away from the hole when the slidable window is being opened.

In certain example embodiments, a method of making a window assembly for use in a vehicle is provided. A slidable window panel including at least one top pin and at least one bottom pin attached thereto is provided. A single fixed window panel including a hole being defined therein for receiving the slidable panel is provided. An elongated upper rail including an upper rail channel defined therein for slidingly receiving the at least one top pin attached to the slidable panel is connected to the fixed panel. An elongated lower rail including a lower rail channel defined therein for slidingly receiving the at least one bottom pin attached to the slidable panel is connected to the fixed panel. Forward and rear end details are connected to each of the upper and lower rails proximate to the hole for slidingly receiving, in respective channels formed therein, the at least one top pin and the at least one bottom pin. The upper rail channel and the lower rail channel are provided at a common depth. The slidable panel is laterally movable when being opened via the respective rail channels provided to the upper and lower rails. The channels in the forward and rear end details are formed so that the slidable panel is movable slightly outwardly towards the hole when the slidable window is being closed and slightly inwardly away from the hole when the slidable window is being opened.

In certain example embodiments, a vehicle comprising a window assembly is provided. It may include the window assembly described herein. For example, a slidable window panel includes at least one top pin and at least one bottom pin attached thereto. A single fixed window panel includes a hole being defined therein for receiving the slidable panel. An elongated upper rail includes an upper rail channel defined therein for slidingly receiving the at least one top pin attached to the slidable panel, the upper rail being connected to the fixed panel. An elongated lower rail includes a lower rail channel defined therein for slidingly receiving the at least one bottom pin attached to the slidable panel, the lower rail being connected to the fixed panel. Forward and rear end details are provided to each of the upper and lower rails proximate to the hole for slidingly receiving, in respective channels formed therein, the at least one top pin and the at least one bottom pin. The upper rail channel and the lower rail channel are provided at a common depth. The slidable panel is laterally movable when being opened via the respective rail channels provided to the upper and lower rails. The channels in the forward and rear end details are formed so that the slidable panel is movable slightly outwardly towards the hole when the slidable window is being closed and slightly inwardly away from the hole when the slidable window is being opened.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1A:
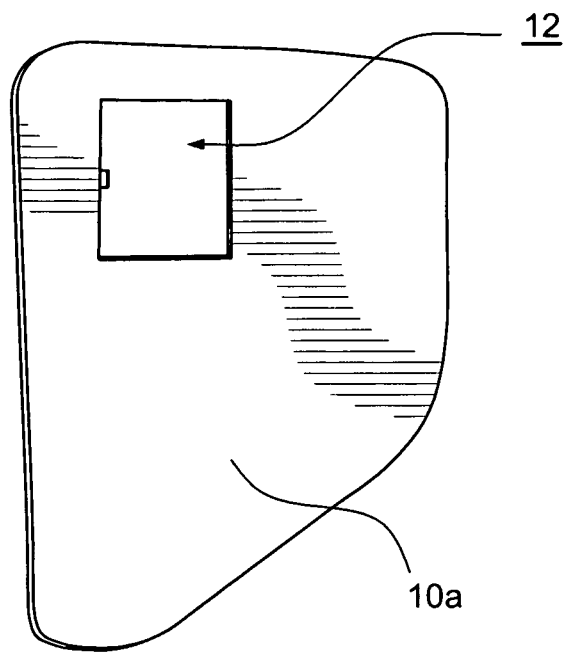
FIG. 1a is a front perspective view of an outer piece of glass having a hole formed therein in accordance with an example embodiment.

Certain example embodiments of this invention relate to an improved slider glass assembly suitable for use in utility cabs, such as those found in or on construction vehicles, road graders, combines, tractors, etc. Certain example embodiments also may be incorporated into other types of vehicles including, for example, passenger vehicles. More particularly, the slider glass assemblies of certain example embodiments may be used in connection with side windows or back glass in these types of vehicles. Advantageously, the slider glass assembly design of certain example embodiments includes structural components that are easily modifiable so as to incorporate other cab or vehicle designs. The improved slider glass assembly of certain example embodiments allows utility cab operators to pass items into and out of the cab compartment more readily, e.g., without the need to open the whole cab door assembly. Furthermore, the improved slider glass assembly of certain example embodiments incorporates a more robust water resistant sealing means than what is currently available in today's market.

Indeed, in certain example embodiments, the sliding window is guided substantially parallel to an outer glass window until it becomes close to a hole formed in the outer glass. At such location(s), front and rear end details help guide the sliding window in and toward the hole so as to close and seal it.

In other words, certain example embodiments relate to a sliding window assembly (e.g., of the type found in utility cabs or other vehicles), and methods of making the same. A slidable window panel includes at least one top pin and at least one bottom pin attached thereto. A single fixed window panel includes a hole being defined therein for receiving the slidable panel. Elongated upper and lower rails include upper and lower rail channels defined therein for slidingly receiving the at least one top and bottom pin attached to the slidable panel. The upper and lower rails are connected to the fixed panel. Forward and rear end details are provided to each of the upper and lower rails proximate to the hole for slidingly receiving, in respective channels formed therein, the at least one top pin and the at least one bottom pin. The slidable panel is laterally movable when being opened via the respective rail channels provided to the upper and lower rails. The channels in the forward and rear end details are formed so that the slidable panel is movable slightly outwardly towards the hole when the slidable window is being closed and slightly inwardly away from the hole when the slidable window is being opened. Such sliding window assemblies may be built into a wide variety of vehicles and/or cabs. Methods of making the same also are provided in certain example embodiments of this invention.

Referring now more particularly to the accompanying drawings in which like reference numerals indicate like parts/layers throughout the several views.

As noted above, certain example embodiments include a sliding glass window assembly that allows an occupant inside the utility cab or passenger compartment to open up an access hole to the outside of that compartment. The glass assembly of certain example embodiments include a number of features that may be implemented in any suitable combination or sub-combination.

Figure 1B:
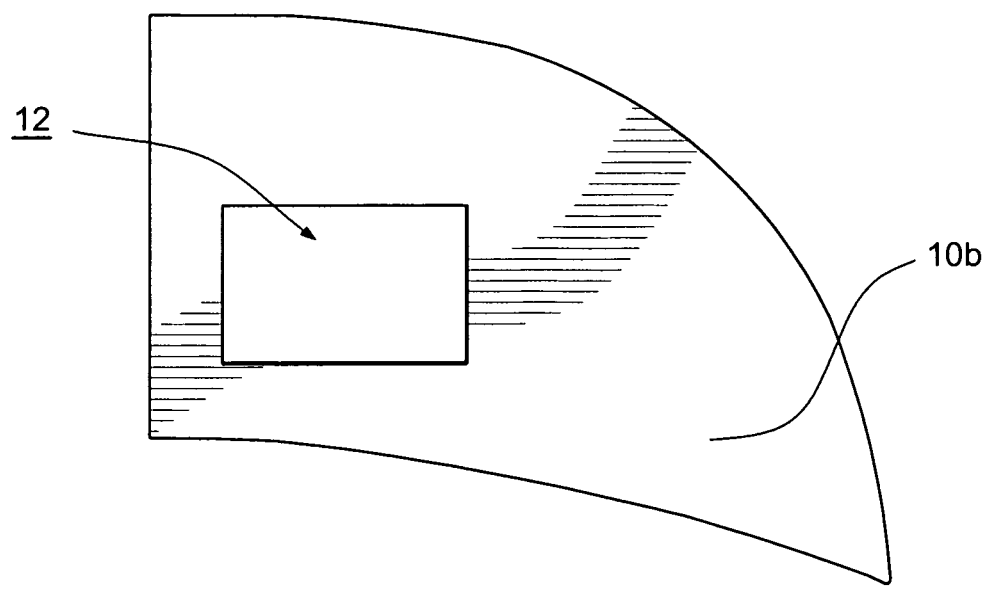
FIG. 1b is a side view of an outer piece of glass having a hole formed therein in accordance with another example embodiment.

For example, the window assembly of certain example embodiments includes an outer piece of glass that may be tempered, heat strengthened, and/or laminated. This outer piece of glass may have a hole cut into the inner section of the glass. Such a hole may be formed in any suitable size and shape. For example, it may be substantially square, rectangular, circular, ovular, etc. In this regard, FIGS. 1a and 1b show outer pieces of glass 10a and 10b having holes 12 formed therein, in accordance with example embodiments of this invention. More particularly, FIG. 1a is a front perspective view of an outer piece of glass 10a having a hole 12 formed therein in accordance with an example embodiment, and FIG. 1b is a side view of an outer piece of glass 10b having a hole 12 formed therein in accordance with another example embodiment.

The glass used in the manufacture of the slider can be of several different types in example embodiments of this invention. For example, one glass type may be a single thickness, tempered piece of glass of 4.0 mm thickness. In certain example embodiments, this thickness can vary as much as +/−1.0 mm. It is also possible to have a laminated glass version of the glass in certain example embodiments, as well. One possible exception to a fully annealed laminated glass is that the laminated glass in some circumstances may need to be of a heat-strengthened nature. The example types of glass described above may also be used in connection with both the outer glass as well as the moveable glass described below.

As explained in greater detail below, it is sometimes desirable to have the glass surfaces to be bonded to have a layer of black frit paint fired onto those surfaces. The black frit layer may serve several different purposes in example embodiments of this invention. For example, the black frit makes for a more aesthetically pleasing appearance of the finished glass assembly. Additionally, the black frit adds a high degree of UV protection to the glues and adhesives that will be used to bond the assembly components together.

Figure 2:
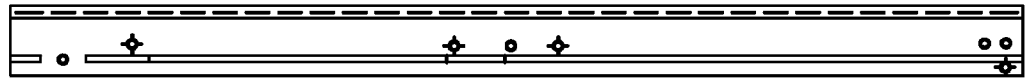
FIG. 2 is a view of a rail in accordance with an example embodiment.
Figure 3:
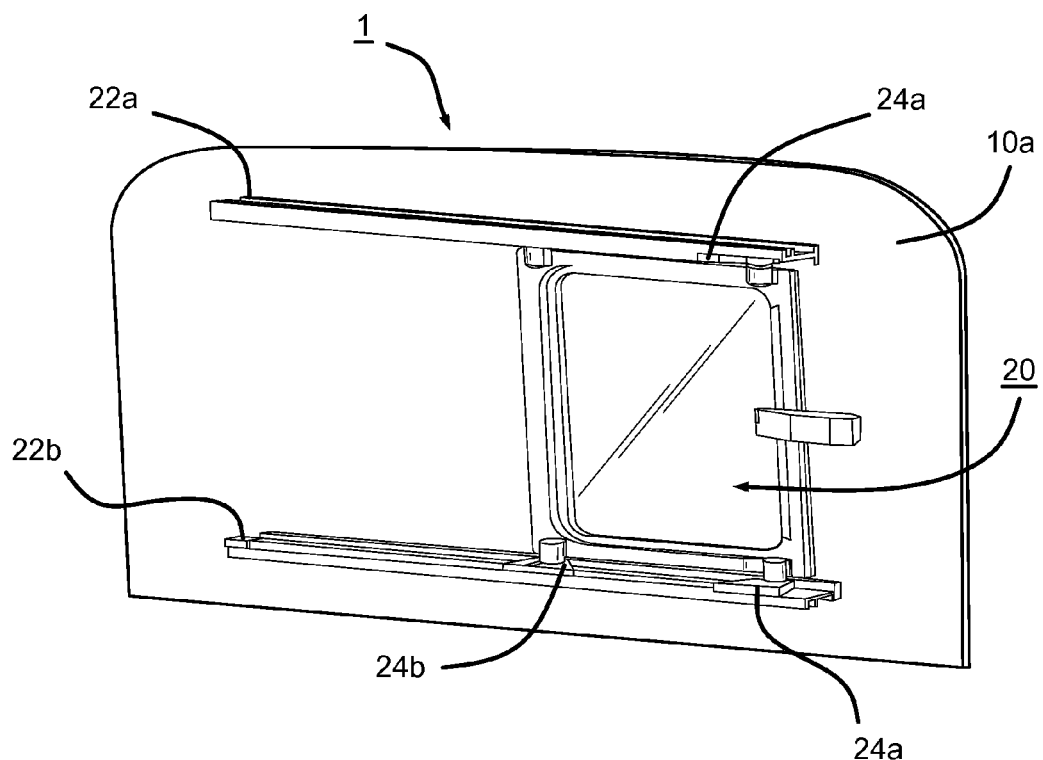
FIG. 3 is a side view of a movable, sliding glass portion of a window assembly being attached to the outer glass via upper and lower rails, in accordance with an example embodiment.
Figure 3A:
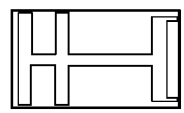
FIG. 3a is a cross-sectional view of the rails 22a shown in FIG. 3.

Rails may be bonded generally above and below the hole in the outer piece of glass. The rails may be made of any suitable material including, for example, aluminium. Such aluminium rails may be spaced apart and in the proper orientation so as to form guiding rails for the moveable, sliding glass portion of the window assembly of certain example embodiments. In this regard, FIG. 2 is a view of a rail in accordance with an example embodiment, and FIG. 3 is a side view of a movable, sliding glass portion 20 of a window assembly 1 being attached to the outer glass 10a via upper and lower rails 22a and 22b. The rails (e.g., of aluminium) of certain example embodiments may be formed via an extruding process. Forming the rails 22a and 22b in this way may allow them to be cut relatively easily into the appropriate length for the specific window application.

Figure 4:
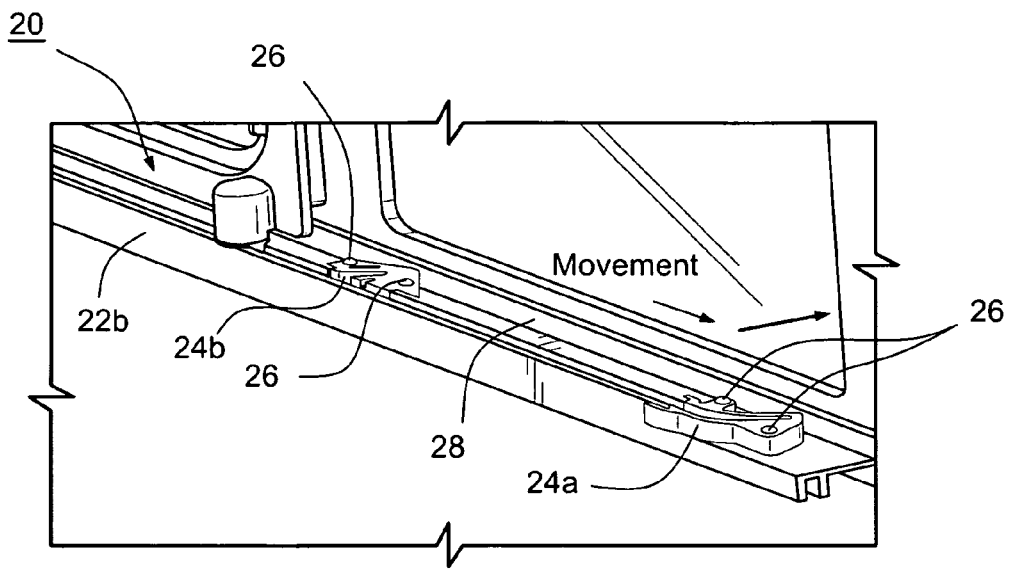
FIG. 4 is an enlarged view of the lower portion of FIG. 3.

The aluminium rails also may be designed to allow for one common extrusion section to be used for either or both of the upper and lower rail in certain example embodiments. Furthermore, specific areas of the aluminium rails may be machined away (an example of which is shown perhaps best in FIGS. 2 and 4) in certain example embodiments, e.g., to allow for specially designed end details (e.g., end details 24a and 24b shown in FIGS. 5a and 5b, respectively) to be fastened to the remaining sections of the aluminium rails. The end details of certain example embodiments may be designed to allow the moveable sliding glass portion to move outwardly towards the outer piece of glass. This outward motion, combined with the lateral motion of closing the sliding glass, allows the moveable glass 20 to achieve its final closed position.

Although the main support rails described above have been described as being constructed from an extruded aluminum, the present invention is not so limited. For example, it is possible to also fabricate the rails of certain example embodiments from an injection molded plastic. If this were to be done, a plastic such as TPU (Thermal Plastic Material), long glass fiber filled material, could be used. Commercially available TPU materials include a plastic from ASchulman called PBX 15-15, as well as a plastic available from Ticona called Celstran PUG 30. Both of these example materials are urethane based plastics that contain 30% glass fibers. Other plastics that could be used include PBT materials such as Rynite 30 available from Dupont.

However, the use of aluminum rails may be advantageous because of the ability to cut the extruded aluminum profile to desired lengths to accommodate a wide variety of glass openings. It is also desirable in certain example embodiments to e-coat the aluminum. This e-coat may serve as a primer coating that may reduce (and sometimes even eliminate) the need to use chemical primers on the aluminum later as the actual bonding assembly occurs. E-coating and priming techniques are described in greater detail below.

Figure 5A:
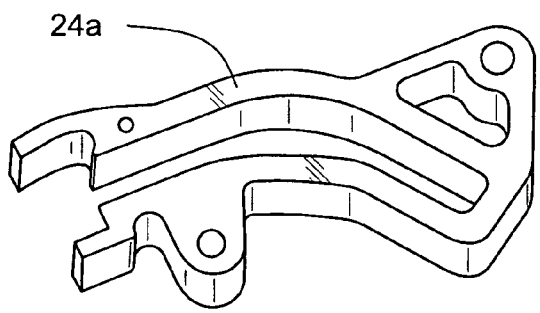
FIGS. 5a and 5b are example partial perspective views of illustrative end details in accordance with certain example embodiments.
Figure 5B:
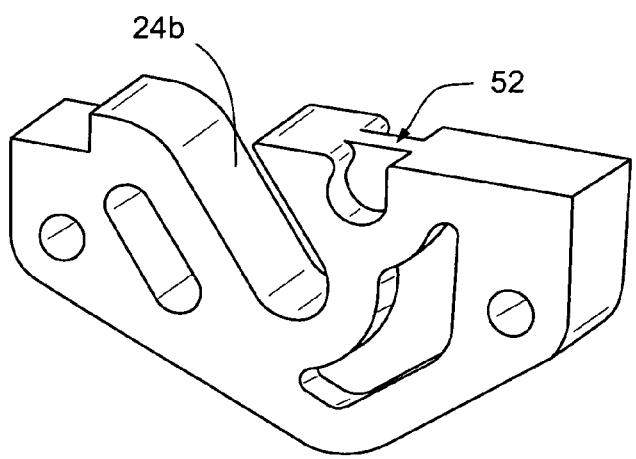

As alluded to above, FIGS. 5a and 5b are example partial perspective views of end details 24a and 24b, respectively, in accordance with certain example embodiments. Such example details may be machined details, details made by injection molding, or produced by other means. Furthermore, such details 24a and 24b may be press fitted into the aluminium rails or retained in final position (e.g., so that one or more grooves 52 formed on the underside of the end details engage with a upwardly extending portion or edge 28 of the rail 22, or vice versa) with mechanical fasteners or other means. For example, screws or other fasteners 26 may be used to secure the details 24a and 24b to the lower rail 22b (or the upper rail 22a). Adhesives optionally may be used in connection with certain example embodiments. In other words, in certain example embodiments, some or all of the end details need not be integrally formed with the upper and/or lower rails.

The movable glass 20 may move along the upper and lower rails 22a and 22b to open and close. More particularly, in certain example embodiments, the movable glass 20 may move in a manner that is substantially parallel to the outer glass 10a when it is not proximate to the opening 12 formed therein. This movement may be facilitated by grooves or channels respectively formed in the upper and lower rails 24a and 24b. That is, the movable glass 20 may move along the grooves or channels formed in the upper and lower rails 22a and 22b in a manner that is substantially parallel to the outer glass 10a, regardless of whether the outer glass 10a is substantially flat, curved, or otherwise shaped. First and second grooves at different depths also may help to facilitate the movement of the movable glass 20, although in certain example embodiments, such functionality may instead or in addition be provided or supplemented via the end details described herein. The grooves or channels formed in the upper channel and the grooves or channels formed in the lower channel may be formed at common depths in certain example embodiments.

When the movable glass 20 is close to the opening 12 formed in the outer glass 10a, the movable glass 20 is made to move closer to the hole 12 formed in the outer glass 10a. This movement may be facilitated by the end details 24a and 24b in certain example embodiments. For example, as will be appreciated from the enlarged views of FIGS. 5a and 5b, the end details 24a and 24b include channels or grooves that help guide the movement of the movable glass 20. For example, the front end detail 24a may include a channel of a first shape that is somewhat C-shaped, e.g., that includes a curve so as to hold and guide the movable window 20 substantially parallel to the outer glass 10a until it nears the hole 12. Then, prior to the hole 12, the front end detail 24a curves so as to hold and guide the movable window 20 closer to the outer glass 10a. Once the movable window 20 is closer to the hole 12, the front end detail 24a straightens out so as to position the movable glass 20 over the hole 23, thereby closing and sealing it. The rear end detail 24b includes a channel of a second shape that may, in certain example embodiments, correspond with the last portion of the channel of the front end detail 24a, such that the movable glass is stopped and securely held in place. It will be appreciated that this sort of movement is reversed when the window is opened (e.g., the window moves slightly inwardly and away from the hole when it is proximate thereto, and then moves substantially parallel to the outer glass window).

As explained in greater detail below, a series of pins or pucks attached, directly or indirectly, to the movable glass 20 slidable along channels or grooves formed in the rails may facilitate the substantially longitudinal movement of the moveable glass 20 when it is not proximate to the hole 12, and the end details 24a and 24b connected to the rails may facilitate the at least partially lateral movement of the movable glass 20 closer to and away from the hole 12 formed in the outside glass 10a.

The upper and lower rails 24a and 24b may be bonded to the outer glass 10a via one or more adhesives. The surface of the outer glass 10a to which the upper and lower rails 24a and 24b are to be bonded may or may not be covered with a layer of ceramic frit in certain example embodiments. Indeed, a fritted surface may be advantageous at least from a cosmetic perspective. The aluminium rails of certain example embodiments may be e-coated and/or anodized. E-coating, in general, is used to deposit a paint or lacquer coating on a part. In e-coating, parts are dipped into a vat of the lacquer or paint and are electrified so as to promote a reaction at the surface, which deposits the paint. Anodizing is an electrolytic passivation process used to increase the thickness of the natural oxide layer on the surface of metal parts. Anodic films generally are much stronger and more adherent than most types of paint and metal plating, making them less likely to crack and peel. Anodized aluminium surfaces, for example, are harder than aluminium, but generally have low-to-moderate wear resistance. However, wear resistance can be improved by increasing thickness or by applying suitable sealing substances. Accordingly, e-coating the rail sometimes may be advantageous compared to anodizing, as the need for separate primers when a urethane adhesive is used may be reduced; however, this is not always the case. Indeed, by contrast, if the aluminium rails is anodized, various commercial primers may be applied before the application of a urethane adhesive.

The glass surface to be bonded may in certain example embodiments benefit from adhesion promoters and/or primers. These primers normally comprise an organosilane primer as a first primer, as well as a second primer, normally black in appearance, of a moisture cured urethane material. The clear primer is applied to the area to be bonded and any excess clear primer may be wiped away with a clean, lint-free, dry cloth. Next, the black primer may be applied over the clear primed area. After this operation, it is desirable in certain example embodiments to allow the black primer to cure before final bonding occurs. These priming curing conditions may require an elevated temperature and elevated humidity levels for a predetermined amount of time to allow the black primer to cure properly. Just prior to being bonded, it may be desirable to elevate the primed glass temperature to enhance the strength of the adhesive joint. Example primers include, for example, Dow Automotive Betawipe 435-18 and Dow Automotive Betaprime 435-20A. Other companies supply very similar types of glass bonding primers. These companies include Eftec, YH America, 3M, Ashland Chemical, and others.

It is also desirable in certain example embodiments to prime the attachment area on seal carrier as well. It has been determined that the Dow Automotive Betawipe 435-18 works well for this application, although other primers also may be used.

If the rails are made out of extruded aluminum and the rails are e-coated, a chemical primer is not required before the application of the adhesive. If the aluminum rail is not e-coated, however, it may include a raw aluminum surface, anodized surface, or even a powder painted surface. In such example instances, chemical primers advantageously may be used on or proximate to the area of the aluminum that meets the adhesive. Chemical primers suitable for use in connection with such example instances include, for example, Dow Automotive 435-21 primer and Dow Automotive 435-32 primer. These primers may be used individually or in combination to achieve proper long-term adhesion of the aluminum to the adhesive. Again, these types of chemical primers are commercially available from a number of other companies including Eftec, YH America, Ashland Chemical, and others.

One adhesive suitable for use in connection with example embodiments of this invention is Dow Automotive Betamate structural adhesive. This is a 2-part urethane adhesive that is thoroughly mixed just prior to being applied to the areas to be bonded together. This adhesive can be applied to the glass surface or the opposite joining surface. In some instances, sufficient adhesive may be applied to allow for a strong uniform adhesive joint to develop. One advantage of a two-part urethane adhesive is that the required holding time to hold all the bonded articles together is short, e.g., as determined by the catalyst level used in the adhesive system. Alternative two-part urethane adhesive systems also are commercially available from Ashland Chemical, which supplies a family of structural two-part urethanes called Pliogrip, among others.

Moisture cured urethane adhesives may be used for certain example embodiments of this invention. These adhesives are cured by absorbing moisture from the ambient environment and the absorbed moisture reacts with the adhesive causing the adhesive to cure. Some of these types of adhesives need a relatively long curing time. In such cases, it will be appreciated that a longer holding time may be needed for the bonded parts to be held together in an assembly fixture.

As alluded to above, a urethane adhesive may be used in connection with certain example embodiments. The urethane adhesive of certain example embodiments may be either a one-component, moisture cured adhesive, or a two component reactive adhesive. Also as alluded to above, the glass surface to which the rails may be bonded also may be primed. Primers may be used to help ensure long-term adhesive properties. These glass primers may include a first organosilane primer followed by a moisture cured urethane primer.

Figure 6:
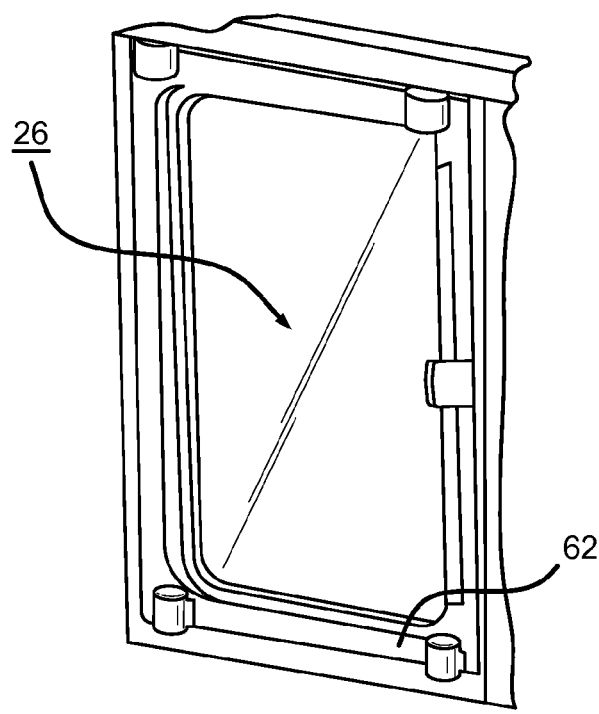
FIG. 6 is a side view of a portion of an example glass assembly that includes a seal carrier that is bonded to a moveable glass component in accordance with certain example embodiments.
Figure 7:
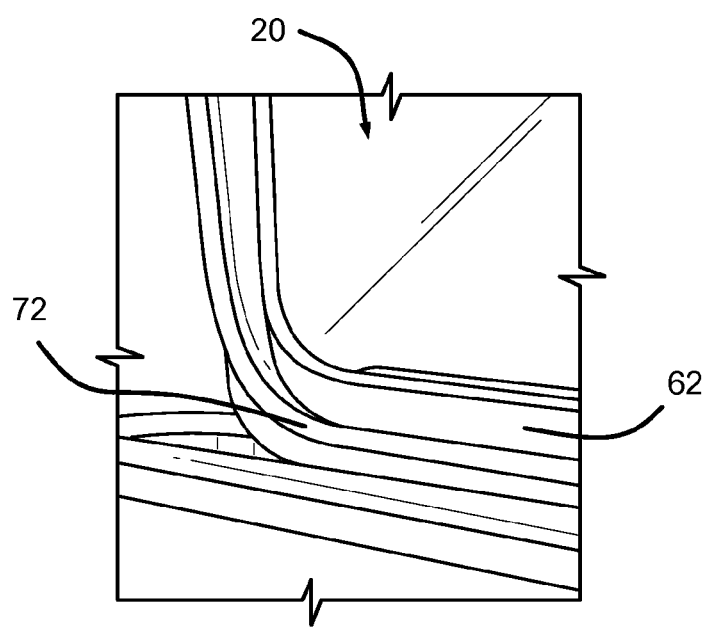
FIG. 7 is an enlarged side view of FIG. 6 that shows a softer seal material bonded to the seal carrier shown in FIG. 6 in accordance with certain example embodiments.

In certain example embodiments, the sliding glass component of the glass assembly 1 may include of a seal carrier 62 that is bonded to the moveable glass 20, as shown in FIG. 6. This seal carrier 62 of certain example embodiments may be an injection molded article made of a glass reinforced plastic such as, for example, Rynite, Arnite, or any other suitable plastic material. Additionally, in certain example embodiments, the seal carrier 62 also may have a suitable softer seal 72 attached thereto. This arrangement is shown, for example, in FIG. 7. This seal 72 may be specifically designed for the specific individual seal carrier 62. The softer seal material may be applied to the seal carrier 72 through the use of a double-sided foam tape (not shown).

The seal carrier 62 also may have attachment or retaining features, e.g., include, for example, pins, pucks, and/or the like. Such pins and/or pucks 82 provide guidance and sliding means in certain example embodiments, and thereby allow the moveable glass assembly 20 to move along the upper and lower aluminium rails 22a and 22b. The pins and/or pucks 82 may be arranged at the four corners of the movable glass assembly 20, e.g., as shown in the FIG. 8 example embodiment. However, the more or fewer pins and/or pucks 82 may be provided at the same or different locations in certain example embodiments of this invention. For example, pins 82 may be provided at the two lower corners and the upper center, etc.

Figure 8:
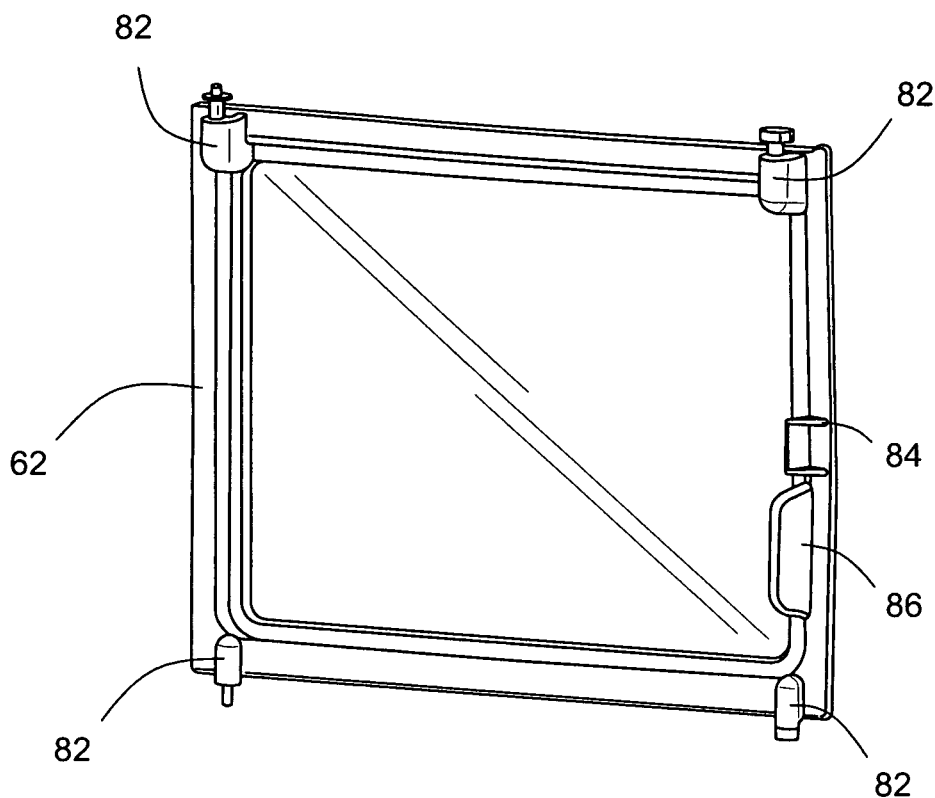
FIG. 8 is a side view of a seal carrier including guiding pins or pucks in accordance with an example embodiment.
Figure 9:
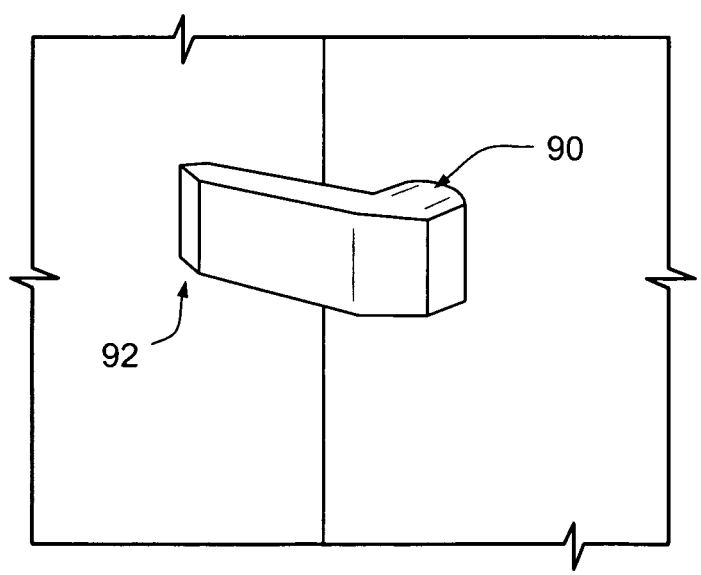
FIG. 9 is an example latch base assembly 90 attached, or bonded, to the outer glass in accordance with certain example embodiments.

The seal carrier 62 also may have another detailed feature in certain example embodiments that may be used for latching the moveable glass 20 into its final closed position. Such a latching feature 84 is shown in FIG. 8 and it may be, for example, a protrusion having a barb at the end for engaging with a suitably formed corresponding latch base assembly formed, for example, on the outer glass 10a. Indeed, FIG. 9 shows an example latch base assembly 90 attached, or bonded, to the outer glass 10a. As a part of the latch base assembly 90, a latch base 92 may be attached, directly or indirectly, to the outer glass 10a through the use of an adhesive, which adhesive may be the same or different adhesive as that described above, e.g., for connecting the rails 22a and 22b to the outer glass 10a. This latch base 92 may facilitate the connection with the latching feature 84 provided to the moveable glass assembly 20. The latch base 92 and the latch 84 may be connected through the use of a mechanical fastener. Thus, in certain example embodiments, a latch provided to the slidable window panel may selectively engage with a latch base provided to the fixed window panel.

Once closed, the soft seal 72 attached the seal carrier 62 substantially closes and seals off the interior of the cab or vehicle in or on which the assembly is attached. To the end, the soft seal 72 may, in certain example embodiments, slightly compress, so as to facilitate a tight seal. A protrusion or handle 86 may enable a person sitting inside the cab or vehicle to open and close the movable assembly accordingly.

It is desirable in certain example embodiments to form the moveable seal glass carrier from an injection molded material. Desirable plastic materials include, for example, TPU (Thermal Plastic Urethane), long glass fiber material. Commercially available TPU materials include a plastic commercially available from ASchluman called PBX 15-15, and a plastic commercially available from Ticona called Celstran PUG 30. Both of these materials are urethane based plastics that contain 30% glass fibers. Other plastics that could be used include PBT materials such as Rynite 30 available from Dupont. These PBT materials may also include a percentage of long glass fibers, normally in the 30% range, although the percentage of glass may vary.

The seal material used on the movable glass assembly of certain example embodiments may be made out of a flexible plastic material. Materials that can be used include, for example, EPDM (ethylene propylene diene M-class rubber), TPEs (thermoplastic elastomers) and TPRs (thermal plastic rubbers). The base of the seal may have a double-side, acrylic foam core tape applied to that base. Optionally, in final assembly, the tape-seal combination may be used in certain example embodiments to tape the seal material to the seal carrier. Tapes suitable for use in connection with certain example embodiments are readily available and include tapes such as, for example, 3M's PT1100 tape.

As noted above, the improved slider glass assembly of certain example embodiments may be suitable for use in utility cabs, such as those found in or on construction vehicles, road graders, combines, tractors, etc., as well as other types of vehicles including, for example, passenger vehicles (such as pickup trucks, etc.). As used herein, the term "vehicle" is intended to encompass any and all such equipment, as well as other similar equipment.

Advantageously, the slider glass assembly design of certain example embodiments may include structural components that are easily modifiable so as to incorporate other cab or vehicle designs. For example, the end details may be modified so as to accommodate a variety of different designs, e.g., where more or less lateral and/or longitudinal movement is advantageous or even required. The rails also may be formed from any suitable material, sized for the appropriate application, and/or structured so as to slide the movable window assembly along an appropriate path. For example, the rails and end details may be curved to accommodate curved outer windows. Additionally, upper and lower rails may be formed from a common mold in certain example embodiments, and the front and rear end pieces may be the same or different in certain example embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A window assembly for use in a vehicle, comprising:
a slidable window panel including at least one top pin and at least one bottom pin attached thereto;
a single fixed window panel including a hole being defined therein for receiving the slidable panel;
an elongated upper rail including an upper rail channel defined therein for slidingly receiving the at least one top pin attached to the slidable panel, the upper rail being connected to the fixed panel;
an elongated lower rail including a lower rail channel defined therein for slidingly receiving the at least one bottom pin attached to the slidable panel, the lower rail being connected to the fixed panel; and
forward and rear end details, which are separate from the upper and lower rails and are affixed to each of the upper and lower rails proximate to the hole, for slidingly receiving, in respective upper and lower end detail channels formed therein, the at least one top pin and the at least one bottom pin, wherein
the respective upper and lower end detail channels are in direct contact with the at least one top pin and the at least one bottom pin without the at least one top pin and the at least one bottom pin being engaged with another member,
the upper and lower forward end detail channels each comprising at least a curved portion adapted to guide the at least one top pin and the at least one bottom pin from the respective rail channels through the curved portion of the respective end detail channels so as to move the slidable panel between open and closed positions, wherein
the slidable panel is movable slightly outwardly towards the hole when the slidable window is being closed and slightly inwardly away from the hole when the slidable window is being opened; wherein
the upper rail channel and the lower rail channel are provided at a common depth, and wherein
the slidable panel is laterally movable when being opened via the respective rail channels provided to the upper and lower rails.

2. The window assembly of claim 1, wherein
the slidable panel includes a seal carrier that extends substantially around the periphery of the slidable panel, the seal carrier having a soft seal attached thereto.

3. The window assembly of claim 2, wherein the soft seal includes a double-sided foam tape.

4. The window assembly of claim 2, further comprising two upper pins and two lower pins, each said pin being provided proximate to one of the corners of the seal carrier.

5. The window assembly of claim 1, wherein
the front and rear details are not integral with the rails.

6. The window assembly of claim 1, wherein
the rails are formed from aluminum.

7. The window assembly of claim 6, wherein
the rails formed from aluminum are e-coated.

8. The window assembly of claim 1, further comprising a latch provided to the slidable window panel for selectively engaging with a latch base provided to the fixed window panel.

9. The window assembly of claim 1, wherein
the upper rail and the lower rail are bonded to the fixed panel via an adhesive.

10. The window assembly of claim 1, further comprising black frit provided to the fixed panel at least proximate to where the rails are provided.

11. A method of making a window assembly of claim 1 for use in a vehicle, the method comprising:
providing the slidable window panel including the at least one top pin and the at least one bottom pin attached thereto;
providing the single fixed window panel including the hole being defined therein for receiving the slidable panel;
connecting to the fixed panel the elongated upper rail including the upper rail channel defined therein for slidingly receiving the at least one top pin attached to the slidable panel;

connecting to the fixed panel the elongated lower rail including the lower rail channel defined therein for slidingly receiving the at least one bottom pin attached to the slidable panel; and connecting the forward and rear end details to each of the upper and lower rails proximate to the hole for slidingly receiving, in respective channels formed therein, the at least one top pin and the at least one bottom pin, wherein the slidable panel is laterally movable when being opened via the respective rail channels provided to the upper and lower rails, and wherein the channels in the forward and rear end details are formed so that the slidable panel is movable slightly outwardly towards the hole when the slidable window is being closed and slightly inwardly away from the hole when the slidable window is being opened.

12. The method of claim 11, further comprising providing a seal carrier that extends substantially around the periphery of the slidable panel, the seal carrier having a soft seal attached thereto.

13. The method of claim 12, wherein the soft seal includes a double-sided foam tape.

14. The method of claim 11, wherein the front and rear details are not integral with the rails.

15. The method of claim 11, wherein the rails are formed from aluminum.

16. The method of claim 15, further comprising e-coating the rails formed from aluminum.

17. The method of claim 11, further comprising providing a latch to the slidable window panel for selectively engaging with a latch base provided to the fixed window panel.

18. The method of claim 11, further comprising bonding the upper rail and the lower rail to the fixed panel via an adhesive.

19. The method of claim 18, further comprising priming the fixed panel prior to the bonding.

20. A vehicle comprising a window assembly, the window assembly including:
a slidable window panel including at least one top pin and at least one bottom pin attached thereto;
a single fixed window panel including a hole being defined therein for receiving the slidable panel;
an elongated upper rail including an upper rail channel defined therein for slidingly receiving the at least one top pin attached to the slidable panel, the upper rail being connected to the fixed panel;
an elongated lower rail including a lower rail channel defined therein for slidingly receiving the at least one bottom pin attached to the slidable panel, the lower rail being connected to the fixed panel; and
forward and rear end details, which are separate from the upper and lower rails and are affixed to each of the upper and lower rails proximate to the hole, for slidingly receiving, in respective upper and lower end detail channels formed therein, the at least one top pin and the at least one bottom pin, wherein
the respective upper and lower end detail channels are in direct contact with the at least one top pin and the at least one bottom pin without the at least one top pin and the at least one bottom pin being engaged with another member, wherein
the upper and lower forward detail channels comprise at least a curved portion adapted to guide the at least one top pin and the at least one bottom pin from the respective rail channels at least partially through the curved portion of the respective end detail channels so as to move the slidable panel between open and closed positions, wherein
the slidable panel is movable slightly outwardly towards the hole when the slidable window is being closed and slightly inwardly away from the hole when the slidable window is being opened, the upper and lower end detail channels directly abutting the upper and lower rail channels, respectively; wherein
the upper rail channel and the lower rail channel are provided at a common depth, and wherein
the slidable panel is laterally movable when being opened via the respective rail channels provided to the upper and lower rails, and wherein
the window assembly further comprises a latch provided to the slidable window panel for selectively engaging with a latch base provided to the fixed window panel.

* * * * *